United States Patent
Arora et al.

(10) Patent No.: US 11,108,646 B2
(45) Date of Patent: Aug. 31, 2021

(54) MANAGING INTERNET OF THINGS NETWORK TRAFFIC USING FEDERATED MACHINE LEARNING

(71) Applicant: Hughes Network Systems, LLC, Germantown, MD (US)

(72) Inventors: Amit Arora, Germantown, MD (US); Satyajit Roy, Germantown, MD (US); John Kenyon, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/732,115

(22) Filed: Dec. 31, 2019

(65) Prior Publication Data
US 2021/0203565 A1    Jul. 1, 2021

(51) Int. Cl.
| | |
|---|---|
| *G06F 15/173* | (2006.01) |
| *H04L 12/24* | (2006.01) |
| *G06N 20/00* | (2019.01) |
| *H04L 29/08* | (2006.01) |
| *H04L 12/851* | (2013.01) |
| *G06N 5/04* | (2006.01) |

(52) U.S. Cl.
CPC ........... *H04L 41/16* (2013.01); *G06N 5/04* (2013.01); *G06N 20/00* (2019.01); *H04L 47/2441* (2013.01); *H04L 67/12* (2013.01)

(58) Field of Classification Search
CPC ..... H04L 41/16; H04L 47/2441; H04L 67/12; G06N 20/00; G06N 20/10; G06N 20/20
See application file for complete search history.

(56) References Cited

U.S. PATENT DOCUMENTS

| | | | |
|---|---|---|---|
| 7,599,290 B2 | 10/2009 | Dos Remedios et al. | |
| 8,676,729 B1* | 3/2014 | Keralapura | H04L 63/1416 706/12 |
| 8,694,630 B1* | 4/2014 | Keralapura | H04L 47/2441 709/223 |
| 8,750,158 B2 | 6/2014 | Morrill et al. | |
| 9,338,065 B2 | 5/2016 | Vasseur et al. | |
| 9,560,060 B2 | 1/2017 | Baxley et al. | |
| 9,654,361 B2 | 5/2017 | Vasseur et al. | |
| 9,832,674 B2 | 11/2017 | Ghai | |
| 9,871,865 B2 | 1/2018 | Shaashua et al. | |
| 9,990,587 B2* | 6/2018 | Okanohara | G06N 20/00 |
| 2012/0047096 A1* | 2/2012 | Duffield | H04L 43/045 706/12 |
| 2015/0254555 A1* | 9/2015 | Williams, Jr. | G06N 3/0454 706/14 |
| 2017/0230279 A1* | 8/2017 | Mozolewski | H04L 69/22 |
| 2018/0032908 A1* | 2/2018 | Nagaraju | G06F 11/30 |
| 2018/0253665 A1* | 9/2018 | Okanohara | G06N 20/00 |
| 2018/0285767 A1* | 10/2018 | Chew | H04L 67/28 |
| 2018/0308013 A1* | 10/2018 | O'Shea | G06N 3/08 |
| 2019/0014048 A1* | 1/2019 | Krishna Singuru | H04L 67/12 |
| 2019/0036716 A1* | 1/2019 | Kasaragod | H04L 63/104 |
| 2019/0042937 A1 | 2/2019 | Sheller et al. | |
| 2019/0182278 A1* | 6/2019 | Das | H04L 63/10 |
| 2019/0311298 A1* | 10/2019 | Kopp | G06K 9/6256 |
| 2020/0007391 A1* | 1/2020 | Yang | H04L 63/14 |
| 2020/0065728 A1* | 2/2020 | Wilson | G06Q 50/182 |
| 2020/0067935 A1* | 2/2020 | Carnes, III | H04L 63/1416 |
| 2020/0082231 A1* | 3/2020 | Calo | G06F 40/279 |
| 2020/0090644 A1* | 3/2020 | Klingler | G01S 3/80 |
| 2020/0120004 A1* | 4/2020 | Kohout | H04L 43/065 |
| 2020/0162503 A1* | 5/2020 | Shurtleff | H04L 63/1416 |
| 2020/0177485 A1* | 6/2020 | Shurtleff | H04L 43/0876 |
| 2020/0334524 A1* | 10/2020 | Sprague | G06N 3/0454 |

OTHER PUBLICATIONS

M. Lopez-Martin, B. Carro, A. Sanchez-Esguevillas and J. Lloret, "Network Traffic Classifier With Convolutional and Recurrent Neural Networks for Internet of Things," in IEEE Access, vol. 5, pp. 18042-18050, 2017. (Year: 2017).*

Bai et al., "Automatic Devide Classification from Network Traffic Streams of Internet of Things," 2018 IEEE 43rd Conference on Local Computer Networks (LCN), 2018, Chicago, IL, USA, 597-605.

Bhattacharya, "A Beginners Guide to Federated Learning," Apr. 6, 2019, retrieved on Mar. 23, 2020, retrieved from URL<https://hackernoon.com/a-beginners-guide-to-federated-learning-b29e29ba65cf>, 8 pages.

Bonawitz et al., "Towards Federated Learning at Scale: System Design," ArXiv, abs/1902.01046, Mar. 22, 2019, 15 pages.

Deng et al., "IoTSpot: Identifying the IoT Devices Using Their Anonymous Network Traffic Data," 2019 IEEE Military Communications Conference, Nov. 12-14, 2019, Norfolk, VA, USA, 6 pages.

Hwang et al., "Traffic Classification Approach Based on Support Vector Machine and Statistic Signature," Proceedings of Conference on Internet of Things and Smart Spaces, International Conference on Next Generation Wired/Wireless Networking, ruSMART 2013 and NEW2AN 2013: Internet of Things, Smart Spaces and Next Generation Networking, Aug. 28-30, 2013, St. Petersburg, Russia, 332-339.

(Continued)

*Primary Examiner* — Jonathan A Bui
(74) *Attorney, Agent, or Firm* — Fish & Richardson P.C.

(57) ABSTRACT

Methods, systems, and apparatus, including computer programs encoded on a computer storage medium, for training and using machine learning models to classify network traffic as IoT traffic or non-IoT traffic and managing the traffic based on the classification. In some implementations, machine learning parameters of a local machine learning model trained by the edge device is received each of at least a subset of a set of edge devices. The machine learning parameters received from an edge device are parameters of the local machine learning model trained by the edge device based on local network traffic processed by the edge device and to classify the network traffic as Internet of Things (IoT) traffic or non-IoT traffic. A global machine learning model is generated, using the machine learning parameters, to classify network traffic processed by edge devices as IoT traffic or non-IoT traffic.

18 Claims, 5 Drawing Sheets

(56) References Cited

OTHER PUBLICATIONS

Kononen et al., "Gradient Descent for Symmetric and Asymmetric Multiagent Reinforcement Learning," Web Intelligence and Agent Systems, Jan. 2005, 3(1):17-30.
Lopez-Martin et al., "Network Traffic Classifier with Convolutional and Recurrent Neural Networks for Internet of Things," IEEE Access, Sep. 6, 2017, 5:18042-18050.
Meidan et al., "ProfilIoT: A Machine Learning Approach for IoT Device Identification Based on Network Traffic Analysis," Proceedings of the Symposium on Applied Computing, Apr. 2017, New York, NY, USA, 506-509.
Mongkolluksamee, "Profiling IoT Devices Based on Network Traffic Analysis," Presented at Proceedings of the 47th Asia Pacific Advanced Network Meeting, Feb. 20, 2019, Daejeon, South Korea, 18 pages.
Ng et al., "Developing a Traffic Classification Platform for Enterprise Networks with SDN: Experiences & Lessons Learned," 2015 IFIP Networking Conference, May 20-22, 2015, Tolouse, France, 9 pages.
Seah et al., "Technical Report: Scalable Traffic Classification in Internet of Things (IoT) for Network Anomaly Detection," Sep. 30, 2019, retrieved on Mar. 23, 2020, retrieved from URL<https://isif.asia/scalable-traffic-classification-in-internet-of-things-iot-for-network-anomaly-detection-2/>, 15 pages.
Shahid et al., "IoT Devices Recognition Through Network Traffic Analysis," 2018 IEEE International Conference on Big Data, Dec. 10-13, 2018, Seattle, WA, USA, 5187-5192.
Shahid et al., "Machine Learning for IoT Network Monitoring," RESSI 2019: Rendez-vous de la Recherche et de l'Enseignement de la Sécurité des Systèmes d'Information, May 2019, Erquy, France, 3 pages.
Sivanathan et al., "Classifying IoT Devices in Smart Environments Using Network Traffic Characteristics," IEEE Transactions on Mobile Computing, Aug. 1, 2019, 18(8):1745-1759.
Sivanathan, "IoT Behavioral Monitoring via Network Traffic Analysis," ArXiv, abs/2001.10632, Jan. 28, 2020, 180 pages.
Tahaei et al., "The Rise of Traffic Classification in IoT Networks: A Survey," Journal of Network and Computer Applications, Mar. 15, 2020, 154:102538, 20 pages.
Wikipedia.org [online], "Federated Learning," last updated Mar. 8, 2020, retrieved on Mar. 23, 2020, retrieved from URL<https://en.wikipedia.org/wiki/Federated_learning>, 5 pages.
Wikipedia.org [online], "Stochastic Gradient Descent," last updated Mar. 19, 2020, retrieved on Mar. 23, 2020, retrieved from URL<https://en.wikipedia.org/wiki/Stochastic_gradient_descent, 7 pages.
Yang et al., "Federated Machine Learning: Concept and Applications," ACM Transactions on Intelligent Systems and Technology, Jan. 2019, 10(2):1-19.
EP Extended European Search Report in International Appln. 20213709.7, dated Jun. 7, 2021, 9 pages.

\* cited by examiner

MANAGING INTERNET OF THINGS NETWORK TRAFFIC USING FEDERATED MACHINE LEARNING

BACKGROUND

Internet of Things (IoT) devices are widespread and take many forms. For example, a household can include wearable devices, home climate controllers, smart speakers, and smart appliances that are capable of connecting to the Internet via a network terminal, e.g., a satellite terminal. These terminals also process other types of network traffic, such as web browsing, video streaming, etc.

SUMMARY

In some implementations, a communication system, e.g., a satellite communication system, can train and use machine learning models to classify network traffic as IoT traffic or non-IoT traffic and manage the traffic based on the classification. For example, a computer system can train a global machine learning model using machine learning parameters received from multiple edge devices, e.g., multiple satellite terminals. The terminals can train local machine learning models based on local network traffic processed by the terminal, e.g., local network traffic received from devices connected to the terminals. The terminals can then send machine learning parameters of the trained models to the computer system. The machine learning parameters received from the terminals can include gradients and/or weights of a neural network trained by the terminals.

The computer system can aggregate the machine learning parameters and use the machine learning parameters to train a global machine learning model that classifies network traffic as being IoT traffic or non-IoT traffic. In some implementations, the computer system can also train a machine learning model to classify the type of IoT device from which network traffic is received in a similar manner, e.g., using machine learning parameters of local machine learning models trained by the terminals to classify network traffic based on the types of IoT devices. The computer system can then provide the trained global model(s) to the terminals for classifying network traffic at the terminals.

In this way, the terminals can classify the network traffic locally, which enables the terminals to manage network traffic based on the classification without having to wait for a remote system to perform the classification. For example, the terminals can prioritize network traffic based on whether the traffic is IoT traffic or non-IoT traffic and/or based on the type of IoT device (e.g., health monitoring device may have a higher priority than a toaster). The terminals can also use selective compression techniques based on the classification(s).

Training the global machine learning model(s) based on machine learning parameters received from terminals in this manner can result in more accurate and/or more robust models as the models are being trained based on a substantial amount of network traffic processed by many different terminals that may process different types of IoT and non-IoT network traffic.

The machine learning models can be trained to classify network traffic based on characteristics of the network traffic, e.g., the size of data packets, time between successive data packets, the number of data packets in a data transmission, times at which data is sent to or received from a device, and/or patterns of network traffic. In this way, the terminals can use the machine learning models to distinguish between IoT and non-IoT network traffic without any explicit knowledge or configuration specific to the devices.

This use of machine learning models provides several advantages over rule-based systems that classify traffic based on the type of data packets and/or port numbers and that depend on deep packet inspection devices in the gateway to react to exceptions in the rule-based system. For example, streaming video downloads can look similar to HyperText Transfer Protocol Secure (HTTPS) traffic from a port and protocol perspective and can only be identified correctly by a gateway side device by deep packet inspective. This means that IoT traffic would likely get incorrectly classified as generic HTTPS traffic by rule-based systems if non-standard port numbers are used, which is likely considering the vast number of different types of IoT devices, different manufacturers, etc. In addition, since a substantial amount of IoT traffic is push (e.g., upload to a cloud service) rather than pull (e.g., download from a web server), a gateway side traffic prioritization device would not be as useful in prioritizing IoT traffic as a terminal side traffic prioritization device. For example, if the classification is performed at the gateway, the pushed traffic would not be prioritized at the terminal meaning that higher priority traffic may be delayed at the terminal while lower priority traffic is sent from the terminal to the gateway.

In one general aspect, the techniques disclosed herein describe methods of training machine learning models to classify network traffic as IoT traffic or non-IoT traffic. According to some aspects, a method includes receiving, from each of at least a subset of a set of edge devices, machine learning parameters of a local machine learning model trained by the edge device, the machine learning parameters received from an edge device being parameters of the local machine learning model trained (i) by the edge device based on local network traffic processed by the edge device and (ii) to classify the network traffic as Internet of Things (IoT) traffic or non-IoT traffic; generating, using the machine learning parameters received from the subset of edge devices, a global machine learning model to classify network traffic processed by edge devices as IoT traffic or non-IoT traffic; and providing the global machine learning model to the set of edge devices for use in classifying network traffic processed by the edge devices as IoT traffic or non-IoT traffic.

Implementations can include one or more of the following features. In some implementations, each edge device trains the local machine learning model of the edge device using local network traffic received from devices connected to the edge device. One or more of the edge devices can include satellite terminals.

In some implementations, the machine learning parameters received from a given edge device comprise at least one of weights between nodes of the local machine learning model trained by the given edge device or gradients of loss functions used by the given edge device to train the local machine learning model.

In some implementations, the machine learning parameters received from a given edge device comprises statistical data that includes statistics of the network traffic processed by the given edge device. Each local machine learning model and the global machine learning model can be trained to classify network traffic as IoT traffic or non-IoT traffic based on at least one of (i) a data size of data packets received from a plurality of devices, (ii) a frequency at which the devices transmit data, (iii) an amount of time between successive transmissions by the devices; or (iv) changes in received signal power of data packets received from the devices.

Some implementations include receiving, from the subset of edge devices, second machine learning parameters of a second local machine learning model trained by the edge device, wherein the edge device trains the second local machine learning model to classify IoT traffic to one or more types of IoT devices, training, using the second machine learning parameters received from the subset of edge devices, a second global machine learning model configured to classify IoT traffic to the one or more types of IoT devices, and providing the second global machine learning model to the set of edge devices.

Some implementations can include receiving updated machine learning parameters from one or more edge devices, updating the global machine learning model using the updated machine learning parameters, and providing the updated global machine learning model.

In some implementations, training, using the machine learning parameters received from the subset of edge devices, a global machine learning model to classify network traffic processed by edge devices as IoT traffic or non-IoT traffic includes training, for each of multiple sets of users, a respective machine learning model for the set of users and providing, to each of the sets of users, the respective machine learning model to edge devices of the set of users. In some implementations, each set of users correspond to a given geographic area different from a geographic area for each other set of users.

Other embodiments include corresponding systems, apparatus, and software programs, configured to perform the actions of the methods, encoded on computer storage devices. For example, some embodiments include a satellite terminal and/or a satellite gateway configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
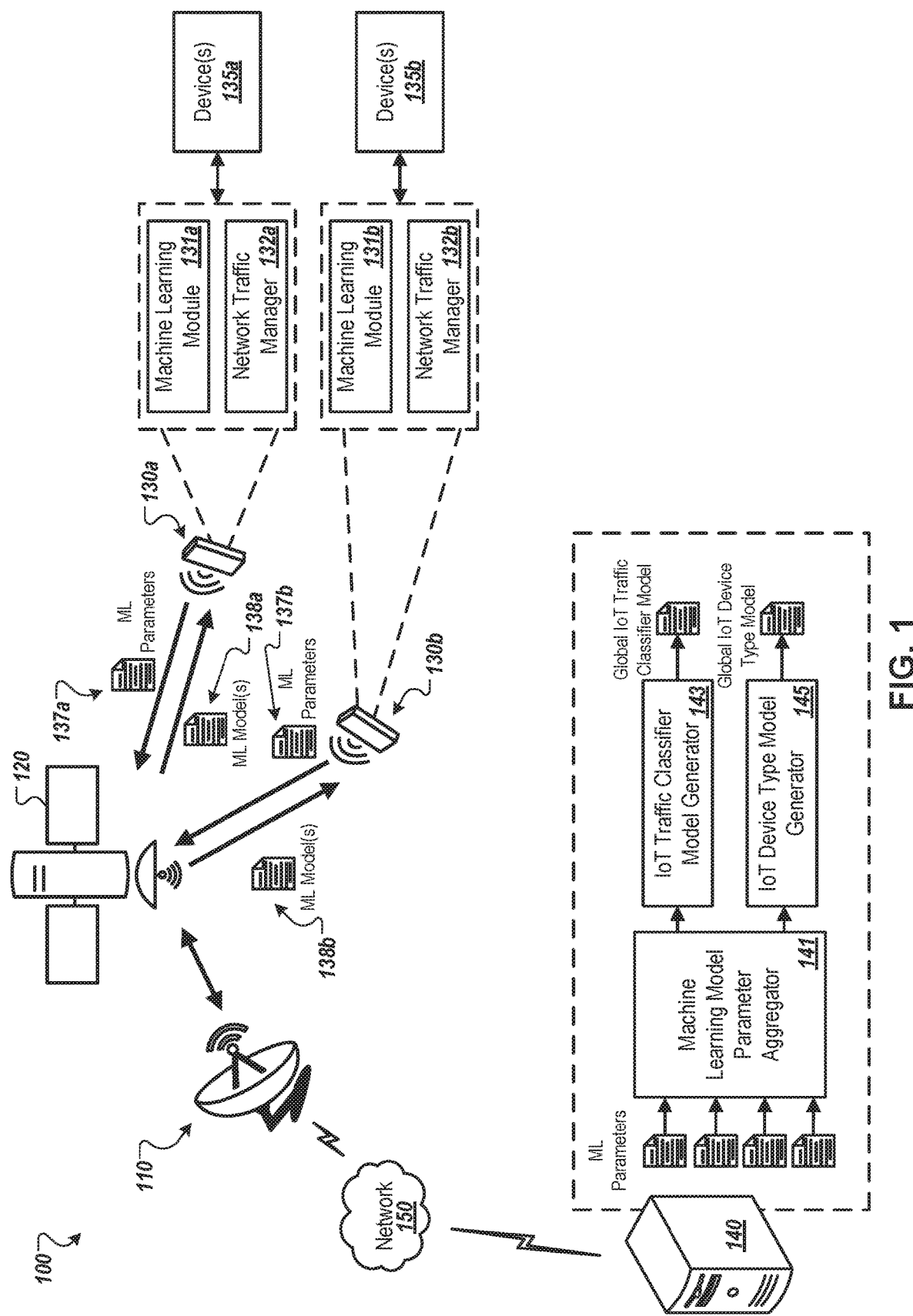
FIG. 1 is a diagram that illustrates an example of a system for using machine learning models to classify network traffic and manage the traffic based on the classification.

FIG. 1 is a diagram that illustrates an example of a system 100 for using machine learning models to classify network traffic and manage the traffic based on the classification. The system 100 includes a satellite gateway 110 that communicates with a satellite 120, which in turn, communicates with satellite terminals 130a and 130b. The terminal 130a can transfer data between the gateway 110 and one or more devices 135a that are connected to the terminal 130a, e.g., via a wireless link. Similarly, the terminal 130b can transfer data between the gateway 110 and one or more devices 135b that are connected to the terminal 130b, e.g., via a wireless link.

The terminals 130a and 130b can process IoT traffic and non-IoT traffic. For example, many IoT devices, such as wearable devices, smart appliances, smart thermostats, send data to remote devices via the gateway 110 and a network 150 connected to the gateway 110. For example, a wearable health monitoring device can send health-related data, e.g., blood pressure, of a person wearing the device to a server of a health monitoring service connected to the network 150. In this example, the device can connect to a terminal 130a, send the data to the terminal 130a, and the terminal 130a can send the data to the server of the health monitoring service via the satellite 120, the gateway 110, and the network 150. The terminals 130a and 130b can also process non-IoT traffic, such as web browsing traffic, video streaming, etc. between the gateway 110 and terminals 130a and 130b.

For the purposes of this document, IoT traffic is considered network traffic that is received from or sent to an IoT device repetitively, e.g., periodically, without requiring a user intervention or initiation for the repetitive transmissions. For example, an IoT device can send periodic updates based on a specified time period. In a particular example, a smart thermostat can send temperature measurements or settings once per hour. In contrast, a web browser of a computer may request web pages or other resources in response to user navigation or selection of controls on a web page and a video streaming device may download video in response to user requests. IoT traffic can also be considered repetitive network traffic that has up to a maximum data size.

Some devices can operate in an IoT mode, while also generating and/or receiving non-IoT traffic. For example, a smart television (TV) can send repetitive updates to user settings or receive repetitive updates to video listings while in an IoT mode. The TV can also operate outside of this IoT mode when sending user-generated requests for videos and/or receiving streaming video from a terminal. The machine learning models described in this document can differentiate between IoT and non-IoT traffic for devices that generate and/or receive both types of network traffic.

IoT traffic can have characteristics that differentiate it from non-IoT traffic. For example, IoT traffic from a given IoT device tends to occur at a regular frequency and the data transmissions are typically similar (e.g., within a threshold difference) in data size. For example, a health monitoring device may send the same type of health related data every ten minutes. Being that the same type of data is sent each time, the data size is typically similar. In contrast, user-requested web browsing traffic and video streaming can vary widely based on the size of the web page or video and occurs at irregular frequencies (e.g., a user may spend more time viewing one web page than another).

The system 110 includes a computer system 140 that trains machine learning models to classify network traffic as IoT traffic or non-IoT traffic and/or to classify IoT traffic based on the type of IoT device from which the traffic is received or to which the traffic is being sent. The computer system 140 can use federated machine learning techniques to train global machine learning models 138a and 138b using machine learning parameters 137a and 137b received from the terminals 130a and 130b. In general, the computer system 140 can provide, to multiple terminals, an initial machine learning model that becomes a local machine learning model at the terminal. Each of these terminals can update its local machine learning model based on its local network traffic. The terminals can provide machine learning parameters of their local machine learning models to the computer system 140. The computer system 140 can update a global machine learning model based on the machine learning parameters received from the terminals. The computer system 140 can then update the local machine learning models with the parameters of the global machine learning model. The computer system 140 and terminals can repeat this process until the global machine learning model is trained, e.g., until a loss function of the global machine learning model converges.

The terminals 130a and 130b include a machine learning module 131a and 131b, respectively. The machine learning module 131a can train and update a local machine learning model to classify network traffic processed by the terminal 130a as IoT traffic or non-IoT traffic based on characteristics of the network traffic. This local machine learning model is also referred to in this document as a local IoT traffic classifier model. For example the devices 135a, which can include IoT devices and non-IoT devices, can send data to the gateway 110 by way of the terminal 130a. Similarly, the gateway 110 can send data to the devices 135a by way of the terminal 130a. The terminal 130a processes the data, e.g., receives and prepares the data for forwarding, in both directions.

In some implementations, the machine learning module 131a trains, as the local IoT traffic classifier model, a local neural network using the network traffic that the terminal 130a processes for the devices 135a. In training a local machine learning model, the machine learning module 131a can determine parameters of the model, such as weights and/or biases of the model. The machine learning module 131a can also update the weights and/or biases based on computed gradients of a loss function with respect to the weights and/or biases. For example, when training a neural network using backpropagation, the machine learning module 131a can compute the gradient of the loss function with respect to weights of the neural network and update the weights to minimize loss.

The machine learning module 131a can train the local IoT traffic classifier model based on characteristics of the network traffic processed by the terminal 130a. As a significant portion of network traffic is secured, the amount of data of the network traffic that can be used to train a local IoT traffic classifier model and classify network traffic may be limited. Thus, the machine learning module 131a can train the local IoT traffic classifier model based on the available characteristics, which can include a device type and/or manufacturer identifier included in data traffic for a device. For example, even if the data is secure, the data can include plaintext that may identify the type of device or manufacturer.

Another characteristic of network traffic that can be used to train the local IoT traffic classifier model is the data size of network transmissions to or from devices. For example, IoT traffic often has the same or similar data sizes, whereas the data size of other types of traffic may vary more widely.

Another characteristic of network traffic that can be used to train the local IoT traffic classifier model is the frequency of network traffic sent to or from the devices. For example, IoT traffic tends to be more periodic than other types of network traffic. The variance in time periods between data transmissions can also be used to train the local IoT traffic classifier model the time periods between data transmissions for IoT traffic tends to be more consistent than non-IoT traffic.

The times at which a device sends or receives data can also be used to train the local IoT traffic classifier model. For example, some IoT devices may be configured to send updates at night when other network traffic may be at a minimum.

Another characteristic of network traffic that can be used to train the local IoT traffic classifier model is the signal power of data transmissions to or from the devices. For example, a person wearing a smart watch can move around relative to a terminal 130a, which can cause changes in the signal power of data transmissions between the terminal 130a and the smart watch. Thus, IoT traffic can have a higher variance than other types of network traffic, such as video streaming traffic. Another characteristic of network traffic that can be used to train the local IoT classifier model is wake and sleep times for devices.

Using federated machine learning techniques, multiple terminals, e.g., terminals 130a and 130b can train a local IoT traffic classifier model and provide the machine learning parameters of the local IoT traffic classifier model to the computer system 140. For example, the machine learning module 131a can train a local IoT traffic classifier model and provide machine learning parameters 137a of the local IoT traffic classifier model to the computer system 140. Similarly, the machine learning module 131b can train a local IoT traffic classifier model, in a similar manner as the machine learning module 131a, and provide machine learning parameters 137b of the local IoT traffic classifier model to the computer system 140. These parameters 137a and 137b can include the weights and/or biases of the local IoT traffic classifier models, the gradients, and/or other machine learning parameters.

In some implementations, the machine learning parameters 137a and 137b can include the characteristics of the network traffic and/or statistics of the network traffic used to train the local IoT traffic classifier model. In either example, the terminals 130a and 130b can encrypt the machine learning parameters 137a and 137b prior to transmitting the machine learning parameters to the computer system 140, which can decrypt the machine learning parameters.

The terminals 130a and 130b can also train a second local machine learning model to classify the type of IoT device from which IoT traffic is received based on characteristics of the network traffic. This local machine learning model is also referred to in this document as a local IoT device type model. For example, the machine learning modules 131a and 131b can train the local IoT device type model using the same or similar characteristics as used to train the local IoT traffic classifier model. The output of the IoT device type model is a type of device, e.g., smart watch, wearable health monitor, smart toaster, etc. The network traffic sent by the same types of IoT devices can be similar in frequency, data sizes, time of day, etc. while different types of IoT devices can vary significantly. For example, a wearable health monitoring device can send data according to a strict frequency while a smart toaster may send data irregularly.

The terminals 130a and 130b can also provide, to the computer system 140, the machine learning parameters of the local IoT device type model. Although only two terminals are shown in FIG. 1, many terminals can train local machine learning models and provide the machine learning parameters of the models to the computer system 140. In some implementations, a proper subset of a set of all terminals can train local machine learning models and provide the parameters. For example, there may be thousands of terminals but only a few hundred train machine learning models and provide machine learning parameters of the models to the computer system 140. The subset of terminals that train the local IoT traffic classifier models can be the same or different from the subset or terminals that train the local IoT device type models.

The computer system 140 includes a machine learning model parameter aggregator 141. The machine learning model parameter aggregator 141 receives the machine learning parameters for each type of machine learning model and aggregates the parameters for each model, e.g., separately. For example, the machine learning model parameter aggregator 141 can receive, from the subset of terminals, the machine learning parameters for the local IoT traffic classifier models and aggregate these parameters. The machine learning model parameter aggregator 141 can also receive, from the subset of terminals, the machine learning parameters for the local IoT device type models and aggregate these parameters.

The computer system 140 also includes an IoT traffic classifier model generator 143 that generates a global IoT traffic classifier model using the aggregated machine learning parameters received for the local IoT traffic classifier models. The computer system 140 can generate the global IoT traffic classifier model by combining the machine learning parameters of the local IoT traffic classifier models. For example, the computer system 140 can compute combined gradients and/or combined weights between nodes using the machine learning parameters. In some neural network implementations, combining weights of the neural networks can include averaging the weights of each link of the deep neural network reported by each terminal. In addition to a simple average, other forms of statistical summaries for combining the weights will also be tried.

The computer system 140 also includes an IoT device type model generator 145 that generates a global IoT device type model using he aggregated machine learning parameters received for the local IoT device type models. The computer system 140 can generate the global IoT device type model by combining the machine learning parameters of the local IoT device type models, in a similar manner as the global IoT traffic classifier model.

In some implementations, the computer system 140 can then update each of the local machine learning models with the parameters of the global machine learning models. For example, the terminals can periodically send their machine learning parameters to the computer system 140 and the computer system 140 can update the global machine learning models based on the received parameters. The computer system 140 and terminals can repeat this process at least until the global machine learning models are trained. Once trained, the computer system 140 can provide the trained global machine learning models 138a and 138b to the terminals, e.g., the terminals 130a and 130b.

The computer system 140 can provide the trained global machine learning models to the subset of terminals that trained the local machine learning models and to other terminals. For example, the computer system 140 can provide the trained global machine learning models to all of the terminals in the satellite communication system. The terminals can use the trained global machine learning models to classify network traffic processed by the terminals as IoT traffic or non-IoT traffic and/or to classify the device from which network traffic is received.

In some implementations, the computer system 140 and the terminals can continue updating the local machine learning models and the global machine learning models even after the global machine learning models are trained. In this way, the models can adapt to new IoT devices and/or to changes in the network traffic of IoT devices.

The terminals 130a and 130b also include a network traffic manager 132a and 132b, respectively. The network traffic managers 132a and 132b can manage network traffic based on the classification of the network traffic. For example, the network traffic managers 132a and 132b can be configured to prioritize IoT traffic over non-IoT traffic or vice versa. The network traffic managers 132a and 132b can be configured to assign respective priority values to IoT traffic and non-IoT traffic. The priority values represent the priority of the network traffic and can be used by the terminals 130a and 130b to prioritize the network traffic. That is, the terminals 130a and 130b can delay network traffic having a lower priority value in order to forward network traffic having a higher priority value.

The terminals 130a and 130b can also process IoT traffic in a different way than non-IoT traffic or based on the type of IoT device. For example, the terminals 130a and 130b can compress IoT traffic in a different way relative to how non-IoT traffic is compressed. In another example, the terminals 130a and 130b can compress IoT traffic from one type of IoT device in a different manner relative to how traffic from a second type of IoT device is compressed. In some implementations, the terminals 130a and 130b can route network traffic differently based on whether the network traffic is IoT traffic or non-IoT traffic, e.g., using different Wide Area Networks (WANs) and/or different satellites for IoT traffic relative to the WAN(s) or satellite(s) for non-IoT traffic. In another example, one type of network traffic can be sent using a satellite while the other type of network traffic can be sent using a terrestrial network, e.g., a mobile network. In another example, the terminals 130a and 130b can block network traffic for (e.g., to or from) a particular type of device, e.g., as a form of parental controls.

In some implementations, the terminals of different groups of users can receive different global machine learning models. For example, the types of IoT devices and/or how they operate may vary based on geographic regions. In this example, terminals in a given geographic region can train local machine learning models that are used to generate global machine learning models for that geographic region. In another example, the computer system 140 can generate global machine learning models for each beam. In this example, the computer system 140 can generate the global machine learning models for a beam using machine learning parameters of local machine learning models trained by terminals within a geographic region covered by the beam.

Figure 2:
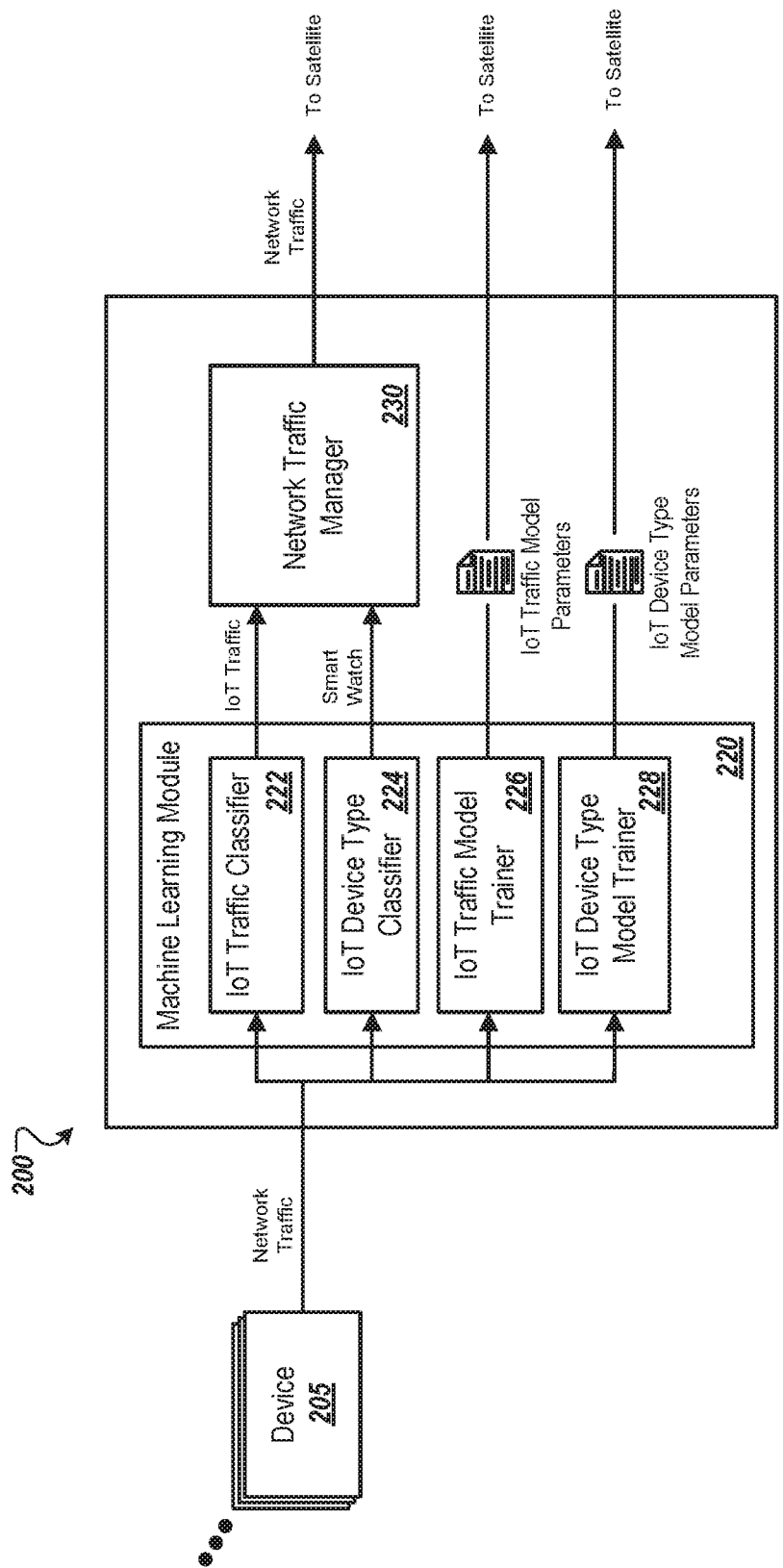
FIG. 2 is a diagram that illustrates an example of a terminal that trains local machine learning models and uses global machine learning models to classify network traffic.

FIG. 2 is a diagram that illustrates an example of a terminal 200 that trains local machine learning models and uses global machine learning models to classify network traffic. The terminal 130a and/or the terminal 130b of FIG. 1 can be implemented as the terminal 200.

The terminal 200 includes a machine learning module 220 and a network traffic manager 230. The machine learning module 220 can receive and process network traffic from multiple devices 205 connected to the terminal 200. These devices can include IoT devices and non-IoT devices. Although not shown, the machine learning module 220 can also receive and process network traffic being sent to the devices 205, e.g., that the terminal 200 received from a gateway.

The machine learning module 220 includes an IoT traffic classifier 222 that uses a machine learning model to classify network traffic received by the terminal 200. The IoT network classifier 222 can use the machine learning model to classify the network traffic to/from each device as IoT traffic or non-IoT traffic. For example, the IoT network classifier 222 can provide, as inputs to the machine learning model, the characteristics of the network traffic received from or sent to the device. The machine learning model can output, based on the inputs, a classification as IoT or non-IoT traffic. In some cases, it may take the machine learning model multiple data transmissions from a device to classify the device as IoT traffic or non-IoT traffic.

Once classified, the network traffic received from or sent to the device can be considered that type of traffic and handled by the network traffic manager 230 according to the classification. In some implementations, the IoT traffic classifier 222 uses a global IoT traffic classifier model received from the computer system 140 to classify the network traffic for each device.

The machine learning module 220 also includes an IoT device type classifier 224. The IoT device type classifier 224 can use a machine learning model to classify each IoT device connected to the terminal 200 to a type of IoT device, e.g., as a wearable device, smart appliance, smart toaster, etc. For example, the IoT device type classifier 224 can provide, as inputs to the machine learning model, the characteristics of the network traffic received from or sent to the IoT device. The machine learning model can output, based on the inputs, a type of IoT device. In some cases, it may take the machine learning model multiple data transmissions from a device to classify the type of the device.

Once classified, the network traffic manager 230 can handle traffic received from or being sent to the device based on the type of the device. In some implementations, the IoT device type classifier 224 uses a global IoT device type model received from the computer system 140 to classify the type of each IoT device.

The machine learning module 220 also includes an IoT traffic model trainer 226. The IoT traffic model trainer 226 can train a local IoT traffic classifier model based on the network traffic received from and/or sent to the devices 205. In some implementations, the IoT traffic model trainer 226 can receive an initial IoT traffic classifier model from the computer system 140 and update the IoT traffic classifier model based on the network traffic received from and/or sent to the devices 205.

The IoT traffic model trainer 226 can send machine learning parameters of the local IoT traffic classifier model to the computer system 140, e.g., via the satellite 120. For example, the IoT traffic model trainer 226 can periodically send the machine learning parameters of the local IoT traffic classifier model to the computer system 140. As described above, the computer system 140 can update a global IoT traffic classifier model based on the machine learning parameters received from multiple terminals. In some implementations, the computer system 140 can also provide the machine learning parameters of the global IoT traffic classifier model to the terminals. The IoT traffic model trainer 226 can update the local IoT traffic classifier model with the updated machine learning parameters of the global IoT traffic classifier model. The IoT traffic model trainer 226 can then continue updating the local IoT traffic classifier model based on the network traffic of the devices 205.

The machine learning module 220 also includes an IoT device type model trainer 228. The IoT device type model trainer 228 can train a local IoT device type model based on the network traffic received from and/or sent to the devices 205. In some implementations, the IoT device type model trainer 228 can receive an initial IoT device type model from the computer system 140 and update the IoT device type model based on the network traffic received from and/or sent to the devices 205.

The IoT device type model trainer 228 can send machine learning parameters of the local IoT device type model to the computer system 140, e.g., via the satellite 120. For example, the IoT device type model trainer 228 can periodically send the machine learning parameters of the local IoT device type model to the computer system 140. As described above, the computer system 140 can update a global IoT device type model based on the machine learning parameters received from multiple terminals. In some implementations, the computer system 140 can also provide the machine learning parameters of the global IoT device type model to the terminals. The IoT device type model trainer 228 can update the local IoT device type model with the updated machine learning parameters of the global IoT device type model. The IoT device type model trainer 228 can then continue updating the local IoT device type model based on the network traffic of the devices 205.

In some implementations, the IoT traffic classifier 222 and the IoT device type classifier 224 use trained global machine learning models received from the computer system to perform their respective classifications. In some implementations, the IoT traffic classifier 222 uses the local IoT traffic classifier model trained by the IoT traffic model trainer 226. In this way, the model used by the IoT traffic classifier 222 is continually being updated based on the network traffic of the devices 205 connected to the terminal 200. Similarly, the IoT device type classifier 224 can use the local IoT device type model trained by the IoT device type model trainer 228. In this way, the model used by the IoT device type classifier 224 is continually being updated based on the network traffic of the devices 205 connected to the terminal 200.

The network traffic manager 230 manages network traffic received from or being sent to the devices 205 based on the classification(s) output by the IoT traffic classifier 222 and/or the IoT device type classifier 224. For example, the network traffic manager can prioritize IoT traffic being sent from the terminal 200 to a gateway over non-IoT traffic being sent from the terminal 200 to the gateway, or vice versa. Similarly, the network traffic manager 230 can prioritize network traffic based on the type of IoT device. The terminal 200 can also compress the data being transmitted differently based on whether the data is IoT data, non-IoT data, or based on the device type.

Figure 3:
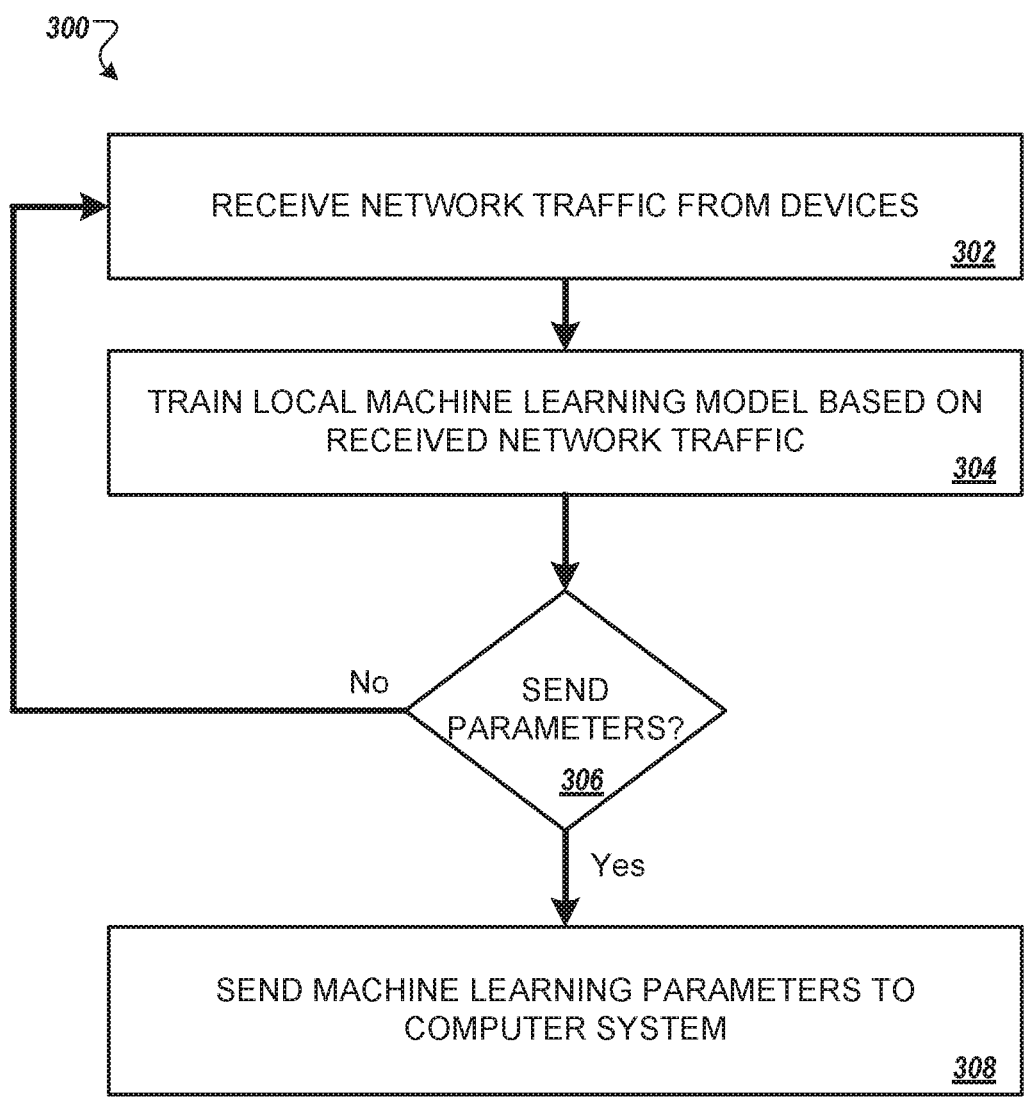
FIG. 3 is a flow diagram that illustrates an example process for training local machine learning models to classify network traffic.

FIG. 3 is a flow diagram that illustrates an example process 300 for training local machine learning models to classify network traffic. The process 300 can be performed by an edge device, such as the terminals 131a and 131b of FIG. 1 or the terminal 200 of FIG. 2.

In step 302, the edge device receives network traffic from multiple devices (302). The network traffic can include, from each of the multiple devices, one or more data packets of one or more data transmissions. The devices can include different types of devices, e.g., one or more IoT devices and one or more non-IoT devices, that are connected to the edge device, e.g., over wireless links. The devices can also include different types of IoT devices.

In step 304, the edge device trains a local machine learning model based on the received network traffic. The edge device can train a local IoT traffic classifier model that classifies network traffic received from and/or being sent to a device as IoT traffic or non-IoT traffic based on characteristics of the network traffic. The edge device can train the local IoT traffic classifier model using network traffic processed by the edge device, e.g., network traffic received from the devices connected to the edge device and/or network traffic being sent to the devices connected to the edge device.

The edge device can also train a local IoT device type model that classifies an IoT device as a type of IoT device based on characteristics of network traffic received from the device or being sent to the device. The edge device can train the local IoT device type model using network traffic processed by the edge device, e.g., network traffic received from the devices connected to the edge device and/or network traffic being sent to the devices connected to the edge device.

As described above, a local machine learning model can be trained using an initial machine learning model. For example, the initial machine learning model can be updated based on the local network traffic processed by the edge device. Training a local machine learning model can include updating machine learning parameters, such as gradients, weights, and/or biases, to reduce a loss function for the local machine learning model.

In step 306, the edge device determines whether to send parameters of the local machine learning model(s) (306). In some implementations, the edge device sends the parameters of the machine learning model(s) based on a specified time period. In some implementations, the edge device sends parameters of a local machine learning model when a loss function converges or meets a training condition.

In step 308, the edge device sends the machine learning models to a computer system. For example, the edge device can send the machine learning parameters to the computer system 140 of FIG. 1 or another computer system that trains global machine learning models using parameters of local machine learning models. The machine learning parameters can include gradients, weights, biases, and/or other appropriate parameters of the local machine learning model(s).

Figure 4:
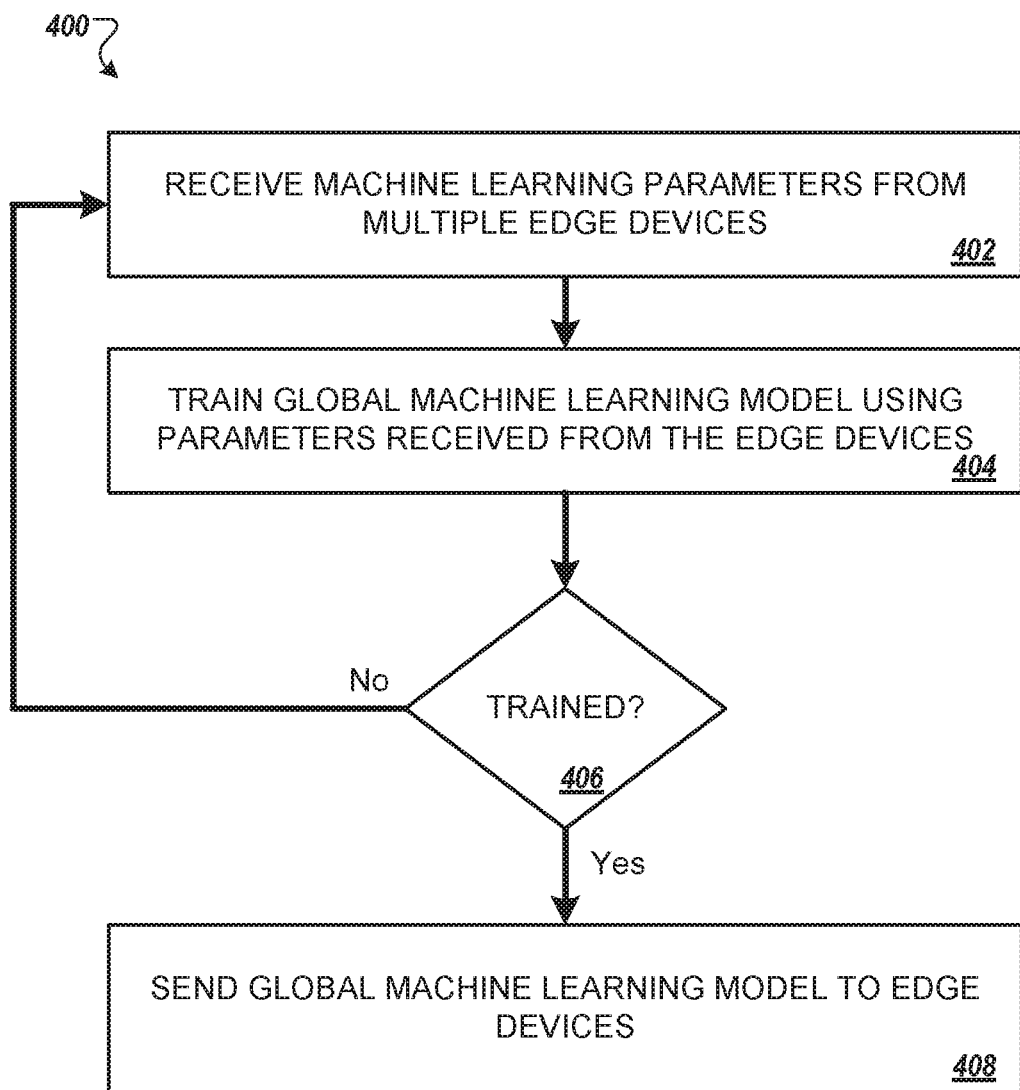
FIG. 4 is a flow diagram that illustrates an example process for training a global machine learning model and providing the global machine learning model to terminals.

FIG. 4 is a flow diagram that illustrates an example process 400 for training a global machine learning model and providing the global machine learning model to terminals. The process 400 can be performed by a computer system, such as the computer system 140 of FIG. 1.

In step 402, the computer system receives machine learning parameters from multiple edge devices. The machine learning parameters received from an edge device can be parameters of a local machine learning model being trained by the edge device. For example, the machine learning parameters can be parameters of a local IoT traffic classifier model that classifies network traffic received from and/or being sent to a device as IoT traffic or non-IoT traffic based on characteristics of the network traffic. In another example, the machine learning parameters can be parameters of a local IoT device type model that classifies an IoT device as a type of IoT device based on characteristics of network traffic received from the device or being sent to the device. As described above, the machine learning parameters can include gradients, weights, biases, and/or other appropriate parameters of the local machine learning model.

In step 404, the computer system trains a global machine learning model using the received machine learning parameters. This training can include updating the machine learning parameters of the global machine learning model based on the machine learning parameters of the local machine learning models. For example, the training can include computing gradients of the global machine learning model based on gradients of the local machine learning model. In another example, the training can include computing weights of the global machine learning model based on weights of the local machine learning models. In some neural network implementations, combining weights of the neural networks can include averaging the weights of each link of the deep neural network reported by each terminal.

In step 406, the computer system determines whether the global machine learning model is trained. For example, the computer system can determine whether a loss function of the global machine learning model has converged.

If not, the process 400 can return to step 402 in which updated machine learning model parameters are received from multiple edge devices. For example, the edge devices can continue training the local machine learning models. In some implementations, each time the global machine learning model is updated, the machine learning parameters of the global machine learning model are sent to the edge devices that are training the local machine learning models. The edge devices can update the local machine learning models using the received parameters and continue training the updated local machine learning models.

In step 408, if the global machine learning model is trained, the computer system sends the global machine learning model to edge devices. The edge devices can then use the global machine learning model to classify network traffic, e.g., as IoT traffic or non-IoT traffic or to a type of IoT device.

The computer system and edge devices can continue training and updating the global and local machine learning models using the process 400. The updated global machine learning model can be made available to edge devices after each update. The edge devices can be configured to download the latest global machine learning model periodically or in response to an update to the global machine learning model.

Figure 5:
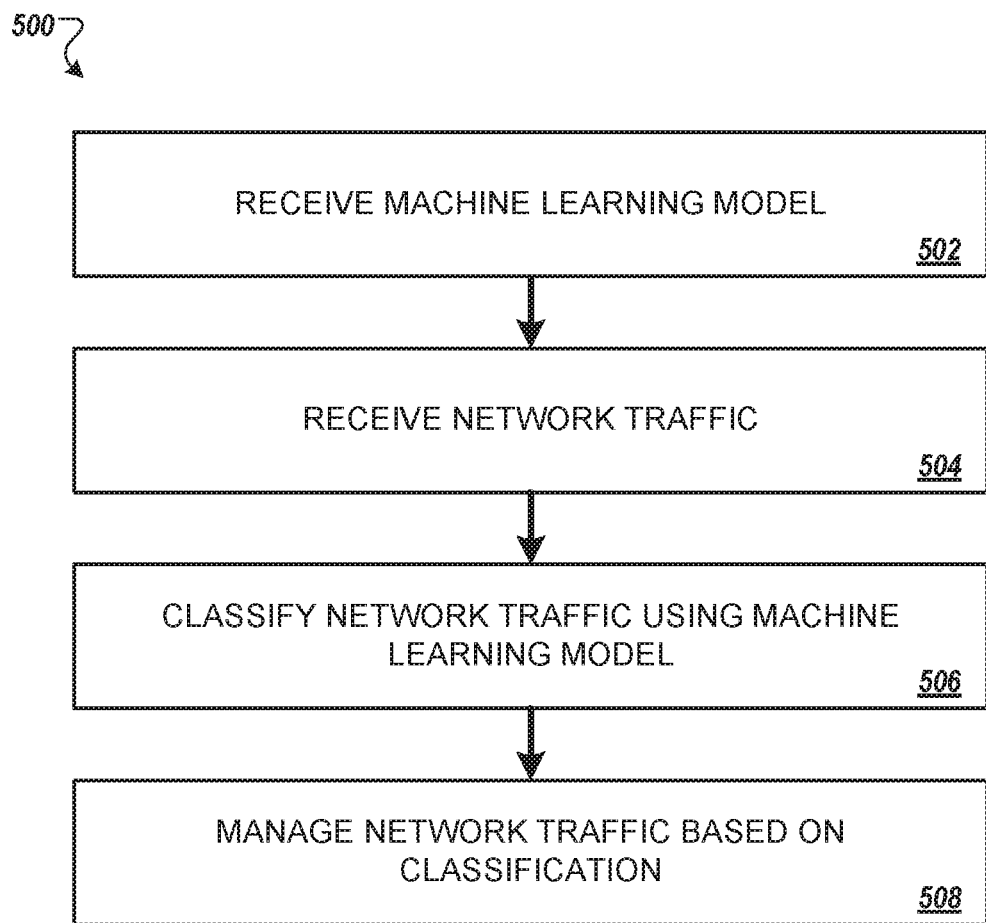
FIG. 5 is a flow diagram that illustrates an example process for classifying network traffic and managing the network traffic based on the classification.

FIG. 5 is a flow diagram that illustrates an example process for classifying network traffic and managing the network traffic based on the classification. The process 500 can be performed by an edge device, such as the terminals 131a and 131b of FIG. 1 or the terminal 200 of FIG. 2.

In step 502, the edge device receives a machine learning model. The edge device can receive a first global machine learning model that classifies network traffic as IoT traffic or non-IoT traffic based on various characteristics of the network traffic, as described above. The edge device can also receive a second global machine learning model that classifies IoT devices to one or more types of IoT devices.

In step 504, the edge device receives network traffic. For example, the edge device can receive data packets from a device connected to the edge device over a wireless link.

In step 506, the edge device classifies the network traffic using the received machine learning model(s). For example, the edge device can evaluate the network traffic to identify characteristics of the network traffic. The edge device can then provide these characteristics as inputs to the first global machine learning model, which classifies the network traffic as IoT network or non-IoT traffic based on the features.

The edge device can also use the second global machine learning model that classifies IoT devices to one or more types of devices, e.g., in response to the first global machine learning model classifying the network traffic as IoT traffic. The second global machine learning model can use the same features as the first global machine learning model or different features from the first global machine learning model.

In step 508, the edge device can manage network traffic based on the classification(s). In some implementations, the edge device can prioritize non-IoT traffic over IoT traffic. For example, a user uploading content may take priority over an appliance sending information to a web server. Traffic from some types of IoT devices can take priority over other IoT devices. For example, network traffic from a health monitoring device can take priority over network traffic from a temperature controller.

The edge device can be configured to assign respective priority values to IoT traffic and non-IoT traffic. The priority values represent the priority of the network traffic and can be used by the edge device to prioritize the network traffic. That is, the edge device can delay network traffic having a lower priority value in order to forward network traffic having a higher priority value.

The edge device can also process IoT traffic in a different way than non-IoT traffic or based on the type of IoT traffic. For example, the edge device can compress IoT traffic in a different way relative to how non-IoT traffic is compressed. In another example, the edge device can compress IoT traffic from one type of IoT device in a different manner relative to how traffic from a second type of IoT device is compressed.

Embodiments of the invention and all of the functional operations described in this specification may be implemented in digital electronic circuitry, or in computer software, firmware, or hardware, including the structures disclosed in this specification and their structural equivalents, or in combinations of one or more of them.

Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more computers, the method comprising:

receiving, from each of at least a subset of a set of edge devices, machine learning parameters of a local machine learning model trained by the edge device, the machine learning parameters received from an edge device being results of machine learning training of the local machine learning model trained (i) by the edge device based on local network traffic processed by the edge device and (ii) to classify the network traffic as Internet of Things (IoT) traffic or non-IoT traffic;

generating, using the machine learning parameters received from the subset of edge devices, a plurality of composite machine learning models to classify network traffic processed by edge devices as IoT traffic or non-IoT traffic, wherein generating, using the machine learning parameters received from the subset of edge devices, the plurality of composite machine learning models to classify the network traffic processed by edge devices as IoT traffic or non-IoT traffic comprises:

training respective composite machine learning models for different groups of users or edge devices; and providing, for each of the different groups of users or edge devices, the corresponding composite machine learning model to edge devices in the group or edge devices of users in the group, for use in classifying network traffic processed by the edge devices as IoT traffic or non-IoT traffic.

2. The method of claim 1, wherein each edge device trains the local machine learning model of the edge device using local network traffic received from devices connected to the edge device.

3. The method of claim 1, wherein one or more of the edge devices in the set of edge devices comprise satellite terminals.

4. The method of claim 1, wherein the machine learning parameters received from a given edge device comprise at least one of (i) values of weights between nodes of the local machine learning model trained by the given edge device or (ii) values of gradients of loss functions used by the given edge device to train the local machine learning model.

5. The method of claim 1, further comprising receiving, from a given edge device, statistical data that includes a plurality of statistics of the network traffic processed by the given edge device.

6. The method of claim 1, wherein each local machine learning model and each composite machine learning model are trained to classify network traffic as IoT traffic or non-IoT traffic based on at least one of (i) a data size of data packets received from a plurality of devices, (ii) a frequency at which the devices transmit data, (iii) an amount of time between successive transmissions by the devices; or (iv) changes in received signal power of data packets received from the devices.

7. The method of claim 1, further comprising:
receiving, from the subset of edge devices, second machine learning parameters of a second local machine learning model trained by the edge device, wherein the edge device trains the second local machine learning model to classify IoT traffic to one or more types of IoT devices;
training, using the second machine learning parameters received from the subset of edge devices, a second composite machine learning model configured to classify IoT traffic to the one or more types of IoT devices; and
providing the second composite machine learning model to the set of edge devices.

8. The method of claim 1, further comprising:
receiving updated machine learning parameters from one or more edge devices;
updating one or more of the composite machine learning models using the updated machine learning parameters; and
providing the one or more updated composite machine learning models.

9. The method of claim 1, wherein each group of users or edge devices corresponds to a given geographic area different from a geographic area for each other group of users.

10. A system, comprising:
one or more computers; and
one or more computer-readable media storing instructions that, when executed by the one or more computers, cause the one or more computers to perform operations comprising:
receiving, from each of at least a subset of a set of edge devices, machine learning parameters of a local machine learning model trained by the edge device, the machine learning parameters received from an edge device being results of machine learning training of the local machine learning model trained (i) by the edge device based on local network traffic processed by the edge device and (ii) to classify the network traffic as Internet of Things (IoT) traffic or non-IoT traffic;
generating, using the machine learning parameters received from the subset of edge devices, a plurality of composite machine learning models to classify network traffic processed by edge devices as IoT traffic or non-IoT traffic, wherein generating, using the machine learning parameters received from the subset of edge devices, the plurality of composite machine learning models to classify the network traffic processed by edge devices as IoT traffic or non-IoT traffic comprises:
training respective composite machine learning models for different groups of users or edge devices; and
providing, for each of the different groups of users or edge devices, the corresponding composite machine learning model to the set of edge devices in the group or edge devices of users in the group, for use in classifying network traffic processed by the edge devices as IoT traffic or non-IoT traffic.

11. The system of claim 10, wherein each edge device trains the local machine learning model of the edge device using local network traffic received from devices connected to the edge device.

12. The system of claim 10, wherein one or more edge devices in the set of edge devices comprise satellite terminals.

13. The system of claim 10, wherein the machine learning parameters received from a given edge device comprise at least one of (i) values of weights between nodes of the local machine learning model trained by the given edge device or (ii) values of gradients of loss functions used by the given edge device to train the local machine learning model.

14. The system of claim 10, wherein the operations comprise receiving, from a given edge device, statistical data that includes a plurality of statistics of the network traffic processed by the given edge device.

15. The system of claim 10, wherein each local machine learning model and each composite machine learning model are trained to classify network traffic as IoT traffic or non-IoT traffic based on at least one of (i) a data size of data packets received from a plurality of devices, (ii) a frequency at which the devices transmit data, (iii) an amount of time between successive transmissions by the devices; or (iv) changes in received signal power of data packets received from the devices.

16. The system of claim 10, wherein the operations comprise:
receiving, from the subset of edge devices, second machine learning parameters of a second local machine learning model trained by the edge device, wherein the edge device trains the second local machine learning model to classify IoT traffic to one or more types of IoT devices;
training, using the second machine learning parameters received from the subset of edge devices, a second composite machine learning model configured to classify IoT traffic to the one or more types of IoT devices; and providing the second composite machine learning model to the set of edge devices.

17. The system of claim 10, wherein the operations comprise:
receiving updated machine learning parameters from one or more edge devices;
updating one or more of the composite machine learning models using the updated machine learning parameters; and
providing the one or more updated composite machine learning models.

18. One or more non-transitory computer-readable media storing instructions that, when executed by one or more computers, cause the one or more computers to perform operations comprising:
receiving, from each of at least a subset of a set of edge devices, machine learning parameters of a local machine learning model trained by the edge device, the machine learning parameters received from an edge device being results of machine learning training of the local machine learning model trained (i) by the edge device based on local network traffic processed by the edge device and (ii) to classify the network traffic as Internet of Things (IoT) traffic or non-IoT traffic;
generating, using the machine learning parameters received from the subset of edge devices, a plurality of composite machine learning models to classify network traffic processed by edge devices as IoT traffic or non-IoT traffic, wherein generating, using the machine learning parameters received from the subset of edge devices, the plurality of composite machine learning models to classify the network traffic processed by edge devices as IoT traffic or non-IoT traffic comprises:
training respective composite machine learning models for different groups of users or edge devices; and
providing, for each of the different groups of users or edge devices, the corresponding composite machine learning model to edge devices in the group or edge devices of users in the group, for use in classifying network traffic processed by the edge devices as IoT traffic or non-IoT traffic.

* * * * *